(12) United States Patent
Heger et al.

(10) Patent No.: US 9,348,341 B2
(45) Date of Patent: May 24, 2016

(54) METHOD FOR SETTING THE FILL LEVEL WHEN FILLING A CAVITY SYSTEM AND A VEHICLE SEAT SYSTEM

(71) Applicant: Faurecia Autositze GmbH, Stadthagen (DE)

(72) Inventors: Thomas Heger, Altenstadt (DE); Peter Winterling, Beuerberg (DE); El Hassan Sadoune, Schongau (DE); Jürgen Santl, Peiting (DE)

(73) Assignee: Faurecia Autositze GmbH (DE)

( * ) Notice: Subject to any disclaimer, the term of this patent is extended or adjusted under 35 U.S.C. 154(b) by 707 days.

(21) Appl. No.: 13/723,297

(22) Filed: Dec. 21, 2012

(65) Prior Publication Data

US 2013/0166078 A1    Jun. 27, 2013

(30) Foreign Application Priority Data

Dec. 24, 2011 (DE) .......................... 10 2011 122 392

(51) Int. Cl.

| | |
|---|---|
| *G05D 9/00* | (2006.01) |
| *B60N 2/66* | (2006.01) |
| *A47C 7/46* | (2006.01) |
| *G05D 9/12* | (2006.01) |
| *B60N 2/44* | (2006.01) |

(52) U.S. Cl.
CPC *G05D 9/00* (2013.01); *A47C 7/467* (2013.01);
*B60N 2/4415* (2013.01); *B60N 2/66* (2013.01);
*B60N 2/665* (2015.04); *G05D 9/12* (2013.01)

(58) Field of Classification Search
None
See application file for complete search history.

(56) References Cited

U.S. PATENT DOCUMENTS

| | | | | |
|---|---|---|---|---|
| 4,467,426 | A * | 8/1984 | Hida et al. | 701/49 |
| 4,634,179 | A * | 1/1987 | Hashimoto et al. | 297/284.6 |
| 4,833,614 | A * | 5/1989 | Saitoh et al. | 701/49 |
| 4,924,163 | A * | 5/1990 | Sakamoto et al. | 318/569 |
| 4,981,131 | A * | 1/1991 | Hazard | 601/24 |
| 5,005,904 | A * | 4/1991 | Clemens et al. | 297/284.6 |
| 6,055,473 | A * | 4/2000 | Zwolinski et al. | 701/49 |
| 2007/0000559 | A1 | 1/2007 | Ebel | |
| 2012/0143108 | A1* | 6/2012 | Bocsanyi et al. | 601/148 |

FOREIGN PATENT DOCUMENTS

| | | |
|---|---|---|
| DE | 20202403 | 6/2003 |
| DE | 102010022020 | 12/2011 |
| JP | 2008007017 | 1/2008 |

* cited by examiner

*Primary Examiner* — Christopher E Everett

(57) ABSTRACT

A method for setting the fill level when filling a cavity system, in particular a cavity system in vehicle seat that exhibits one or more pressure chambers or bubbles for lumbar adjustments. With the method, a fill level set by the user is measured and a value representative thereof is stored. The value representative for the fill level is determined from a curve line that is characteristic for the respective cavity system.

9 Claims, 1 Drawing Sheet

METHOD FOR SETTING THE FILL LEVEL WHEN FILLING A CAVITY SYSTEM AND A VEHICLE SEAT SYSTEM

TECHNICAL FIELD

The invention relates to a method for setting the fill level when filling a cavity system, in particular a cavity system in vehicle seat that exhibits one or more pressure bubbles for lumbar adjustments.

BACKGROUND INFORMATION

Cavity systems with pressure bubbles or chambers that can be adjusted to a desired pressure corresponding to the comfort of the user by being filled or emptied are used to adjust the lumbar support in vehicle seats. This comfort setting can be provided with a so-called memory function which shall be able to reproduce the preset fill level of the cavity system even when the cavity system has been temporarily emptied, as for example when switching off the vehicle or using the reclining adjustment for storing purposes or the like. To this end, the fill level is stored in a memory. For example, the ability to measure the fill pressure of a cavity system using a pressure sensor is known from JP 2008 007 017. The pressure value is saved and when refilling can be recalled through a reading of the pressure sensor returning said pressure the previously set value.

It is the objective of the present invention is to specify an aforementioned method and vehicle seat system that can realize a memory function and that can do completely without the use of pressure sensors.

SUMMARY

To implement the method according to the invention, the cavity system is measured by recording a specific curve of the pressure over time. The curve is measured when filling and emptying the cavity system such that the characteristic data of the cavity system, which preferably is at least one fillable bubble, are available for the filling and emptying processes. The associated pressure values over time are stored.

According to the invention, the curve is then evaluated in order to be able to reproduce a previously set fill level when filling or emptying the cavity system.

Preferably, the slope values of the curve are evaluated. During the filling process, the slope values of the curve are added up continuously or at time intervals such that at the end of the fill process a count value is established for the fill level.

A first branch of the curve is evaluated during filling. The count value is stored in the system such that counting can continue from this count value during the emptying process. It can be provided that a limit count value is specified, which corresponds to a maximum fill level; when this limit is reached, the control feature can be set up such that the fill process is terminated.

During additional filling, the stored count value is increased by adding additional slope values until a maximum limit is reached or the filling process ends by some other means. During an emptying process, the count value is reduced correspondingly. To this end, the amounts of the slope values of a second branch of the curve that is representative of the emptying process are subtracted for the duration of the emptying process such that the count value is reduced accordingly.

During filling or emptying, the system always moves (differentially) along the curve and the associated direction, or the associated branch of the curve, respectively, is determined accordingly by the system, for example by filling or emptying switches.

With this invention, a memory function can be realized without the use of a pressure switch, such that a stored fill level count value can be reached by counting up or down. In this manner it is in particular possible to re-establish the stored count value after fully emptying the cavity system by carrying out the fill process and thus adding up the slope values of the first branch of the curve until the stored count value is reached.

Technically, the slope values in the form of a count frequency can be transferred to a counter connected to the system.

The vehicle seat system according to the invention includes the following: A vehicle seat having a cavity system comprising in particular of one or more pressure bubbles for the lumbar adjustment, a control function for controlling the filling and emptying process of the cavity system, a memory for storing the curve data of the cavity system and of the values that are representative of the fill level of the cavity system as well as an actuation device for filling and/or emptying the cavity system. The memory exhibits data of a curve line that is characteristic for filling or emptying the respective cavity system. The data can be data of the curve line and/or slope values of a curve line. The memory is additionally designed such that it can store additional data during operation, such as the memory setting for the fill level of the cavity system.

Preferably, the memory includes data of the amounts for the slope values of the curve line determined at every point or specified time interval of the curve line.

Preferably, the control feature is designed to implement the method mentioned above.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
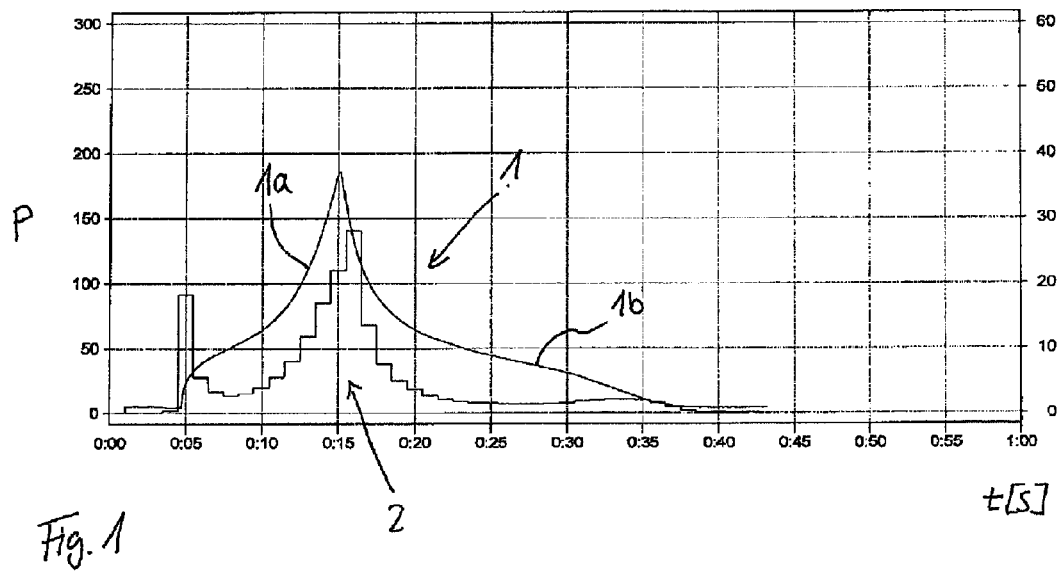
FIG. 1 shows a pressure/time curve and the associated slope values as a function of the time.

The curve lines shown in the Figures exhibit a first branch 1a representative of the filling process of the cavity system of a vehicle seat system and a second branch 1b representative of the emptying process of the same cavity system. The cavity system preferably comprises one or more bubbles or chambers that are provided in the seat cushion of the vehicle seat system. The vehicle seat system comprises also a vehicle seat (not shown) in which the cavity system is integrated, a switch or actuation device for filling the cavity system with a fluid or emptying the same and a control function that controls the filling or emptying process and possibly a memory provided in the control function in order to store data of the curve line or the associated slope values as well as to store a fill level value.

In addition, the control function comprises a processor that compares a specified fill level value, or count value, respectively, to a current fill level value or count value and also determines whether the filling process or emptying process should continue or not.

The curve 1 is recorded as a function of the pressure over time, where the system is initially filled and then emptied, and is representative of the measured cavity system. In this process, the seat is preferably provided with a dummy in order to record the curve 1 under normal load.

For the recorded curve line 1 exhibiting a first branch 1a representative of the filling process and a second branch 1b representative of the emptying process, the slope values of the curve line 1 are determined for each point in time or for each time interval. Mathematically, the associated plot corresponds to the first time derivative of the curve line 1 and in the shown example is designated with the number 2 as a step function over a specified time interval (here with the length of 1 second). Shown is the amount function 2 such that even with a negative slope, the received count value is always positive.

The count values obtained via function 2 for every time interval are added up during the filling process, indicated by an upward move on the first branch 1a of the curve line 1, or are subtracted during the emptying process indicated by a downward move on the second branch of the curve line 2.

The change of the branch or the question, whether the count values are to be added or subtracted is transferred as information to the control function by the actuation device, which the occupant operates, for example for the lumbar adjustment.

Thus, if a user sets a certain fill level value by operating the actuation device, the count value obtained after completing the setting procedure that represents a certain fill level or fill pressure is stored in the memory. If the fill level changes, e.g., by fully emptying the cavity system, then the stored value can be reproduced by starting the filling process and adding up the slope values until the stored value is reached. A memory function can be realized in this manner.

Figure 2:
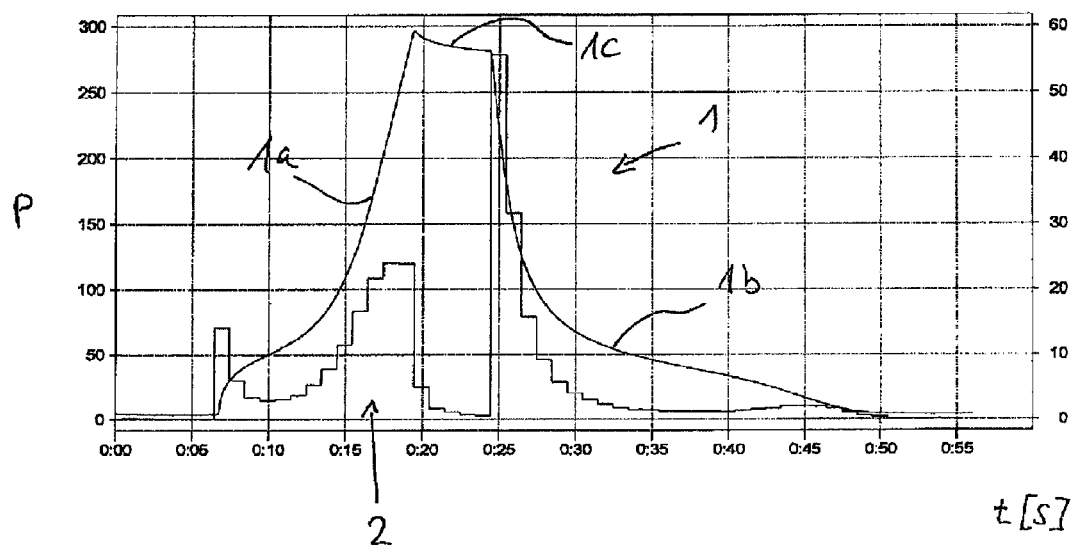
FIG. 2 shows an additional pressure/time curve and the associated slope values as a function of the time.

FIG. 2 shows a third branch 1c between the first branch 1a and the second branch 1b. This third branch arises during recording of curve line 1 if the emptying process is not started immediately after the filling process. Because of existing padding or elastic covers, these are deformed during the filling process of the bubble-shaped cavity system and build up a counter pressure. The pressure at the cavity system decreases over a period of a few seconds due to the inertia of the padding and cover materials, which causes the curve line to drop slightly. This branch 1c can be evaluated as well such that the count value to be stored is not stored immediately following the filling process but rather a few seconds after the conclusion of the filling process. In this case, the count value at the point when branch 1c transitions into branch 1b is stored.

Modifications and substitutions by one of ordinary will in the art are considered to be within the scope of the present invention, which is not to be limited except by the allowed claims and their legal equivalents.

The invention claimed is:

1. A method for setting the fill level when filling a cavity system having one or more pressure chambers for lumbar adjustment in vehicle seats and for which cavity system a pressure over time curve line (1) is initially generated and stored in memory for both a pressure chamber fill operation and a pressure chamber emptying operation prior to a user using said cavity system to fill and empty said pressure chamber, said curve line (1) including a first curve branch (1a) including a plurality of time steps each representative of a value of pressure over time curve for said pressure chamber fill operation and a second curve branch 1(b) including a plurality of time steps each representative of a value of pressure over time curve for said pressure chamber emptying operation, said method comprising the steps of:

storing a current time step value for a current filled or emptied value of said pressure chamber;

receiving, by a processor, from a cavity system actuation device, an indication to perform one of said pressure chamber fill operation or said pressure chamber emptying operation, said indication including a desired pressure chamber fill level time step value; and responsive to said received indication, said processor comparing said stored current chamber fill level time step value with said desired chamber fill level time step value and for causing said pressure chamber to fill or empty based on said comparison and said curve line (1) stored memory.

2. The method as set forth in claim 1, characterized in that to determine the desired chamber fill level time step value from the curve line (1), time step values of the curve line (1) are determined for every point or for every specified time interval of the curve line (1) are added for a duration of the pressure chamber fill operation to said stored current chamber fill level time step value representative for a chamber fill level stored prior to the pressure chamber filling operation.

3. A method as set forth in claim 2, characterized in that only the time step values from the first branch (1a) of the curve line are used for the pressure chamber fill operation.

4. The method as set forth in claim 1, characterized in that to determine the desired chamber fill level time step value from the curve line (1), time step values of the curve line (1) are determined for every point or for every specified time interval of the curve line (1) are subtracted for a duration of the pressure chamber emptying operation from said stored current chamber fill level time step value representative for a chamber fill level stored prior to the pressure chamber emptying operation.

5. A method as set forth in claim 4, characterized in that only the time step values from the second branch (1b) of the curve line (1) are used for the pressure chamber emptying operation.

6. A vehicle seat system with a vehicle seat having a cavity system having one or more pressure chambers for lumbar adjustment in said vehicle seat, and for which cavity system a curve line (1) is initially generated and stored in memory for both a pressure chamber fill process and a pressure chamber emptying process prior to a user using said cavity system to fill and empty said pressure chamber, curve line (1) including a first curve branch (1a) including curve data configured for use during said pressure chamber fill process and a second curve branch 1(b) including curve data configured for use during said pressure chamber emptying process, said vehicle seat including a control function for controlling the filling and emptying processes of the cavity system based on said curve line (1) stored in memory, with a memory for storing said curve data from said curve line (1) of the cavity system, said curve data including step values that are representative of a current fill level of the cavity system as well as an actuation device for controlling filling and/or emptying the cavity system, characterized in that the memory stores data of said curve line (1) that is characteristic for said filling and emptying process of the cavity system.

7. A vehicle seat system as set forth in claim 6, characterized in that the curve data stored in memory includes data of the step values of the curve line (1) determined at every point or specified time interval of the curve line (1).

8. A vehicle seat system as set forth in claim 6, characterized in that that the control function is designed to carry out the method as set forth in claim 1.

9. A method for setting the fill level when filling a cavity system having one or more pressure chambers for lumbar adjustment in vehicle seats and for which cavity system a pressure over time curve line (1) is initially generated and stored in memory for both a pressure chamber fill operation and a pressure chamber emptying operation prior to a user using said cavity system to fill and empty said pressure chamber, said curve line (1) including a first curve branch (1*a*) including a plurality of time steps each representative of a value of pressure over time curve for said pressure chamber fill operation and a second curve branch 1(*b*) including a plurality of time steps each representative of a value of pressure over time curve for said pressure chamber emptying operation, said method comprising the steps of:

storing a current time step value for a current filled or emptied value of said pressure chamber;

receiving, by a processor, from a cavity system actuation device, an indication to perform one of said pressure chamber fill operation or said pressure chamber emptying operation, said indication including a desired pressure chamber fill level time step value; and responsive to said received indication, said processor comparing said stored current chamber fill level time step value with said desired chamber fill level time step value and for causing said pressure chamber to till or empty based on said comparison and said curve line (1) stored in memory, wherein for said pressure chamber fill operation, said processor determines said time step values from the first branch (1*a*) of the curve line (1) for every point or for every specified time interval of the first branch (1*a*) of the curve line (1) and said step values are added for a duration of the pressure chamber fill operation to said stored current chamber fill level time step value representative for a chamber fill level stored prior to the chamber filling operation, and wherein for said chamber emptying operation, said processor determines time step values from the second branch (1*b*) of the curve line (1) for every point or for every specified time interval of the second branch (1*b*) of the curve line (1) and said step values are subtracted for a duration of the pressure chamber emptying operation from said stored current pressure chamber fill level time step value representative for a pressure chamber fill level stored prior to the pressure chamber emptying operation.

* * * * *